March 28, 1950 W. A. GEHLE 2,502,142
APPARATUS FOR TREATING POLLUTED LIQUIDS
Filed Feb. 26, 1948 4 Sheets-Sheet 1
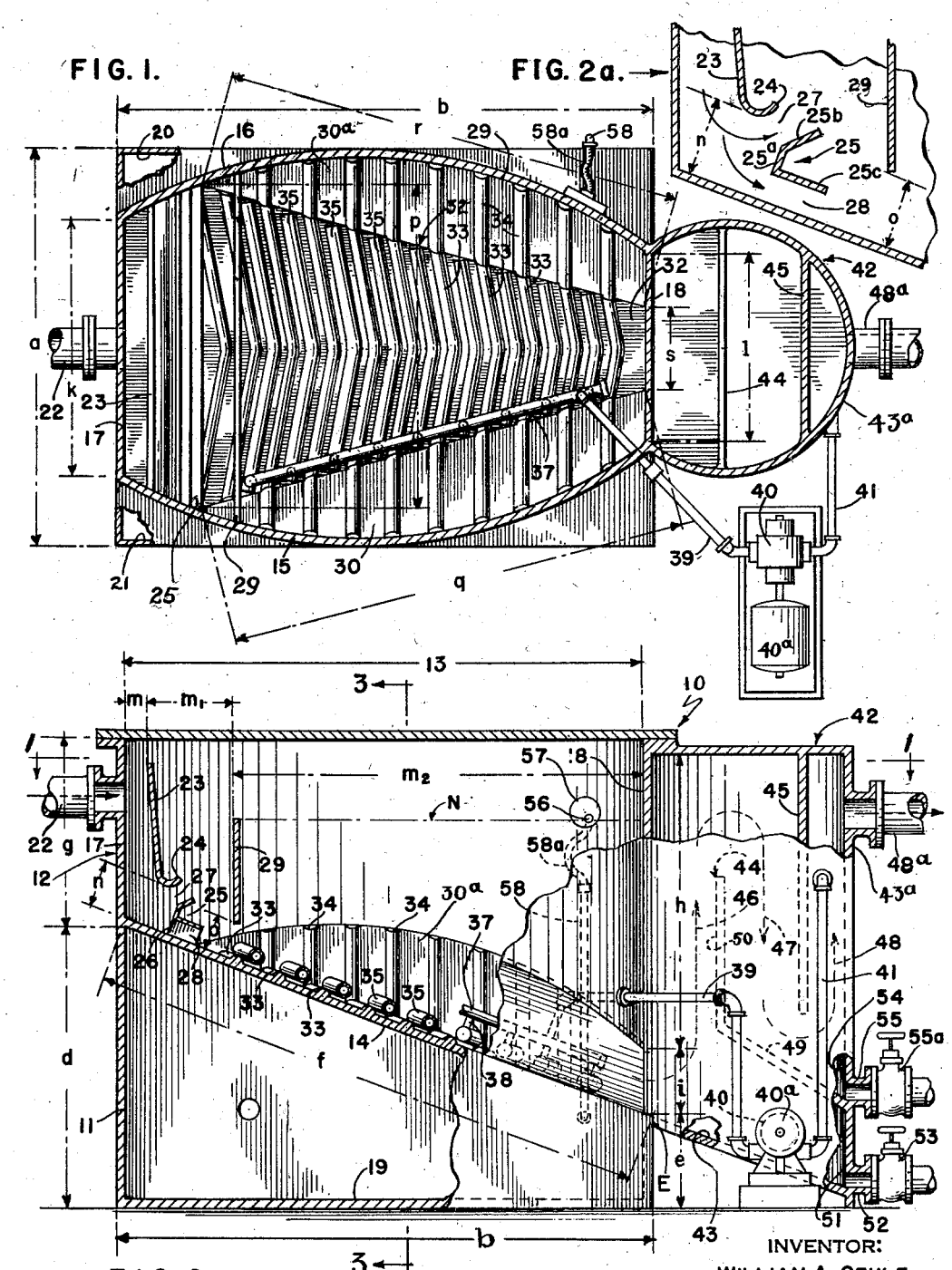
INVENTOR:
WILLIAM A. GEHLE
BY
Arthur Middleton
ATTORNEY March 28, 1950     W. A. GEHLE     2,502,142
APPARATUS FOR TREATING POLLUTED LIQUIDS Filed Feb. 26, 1948     4 Sheets-Sheet 2

INVENTOR:
WILLIAM A. GEHLE,
BY
ATTORNEY

March 28, 1950 — W. A. GEHLE — 2,502,142
APPARATUS FOR TREATING POLLUTED LIQUIDS
Filed Feb. 26, 1948 — 4 Sheets-Sheet 3
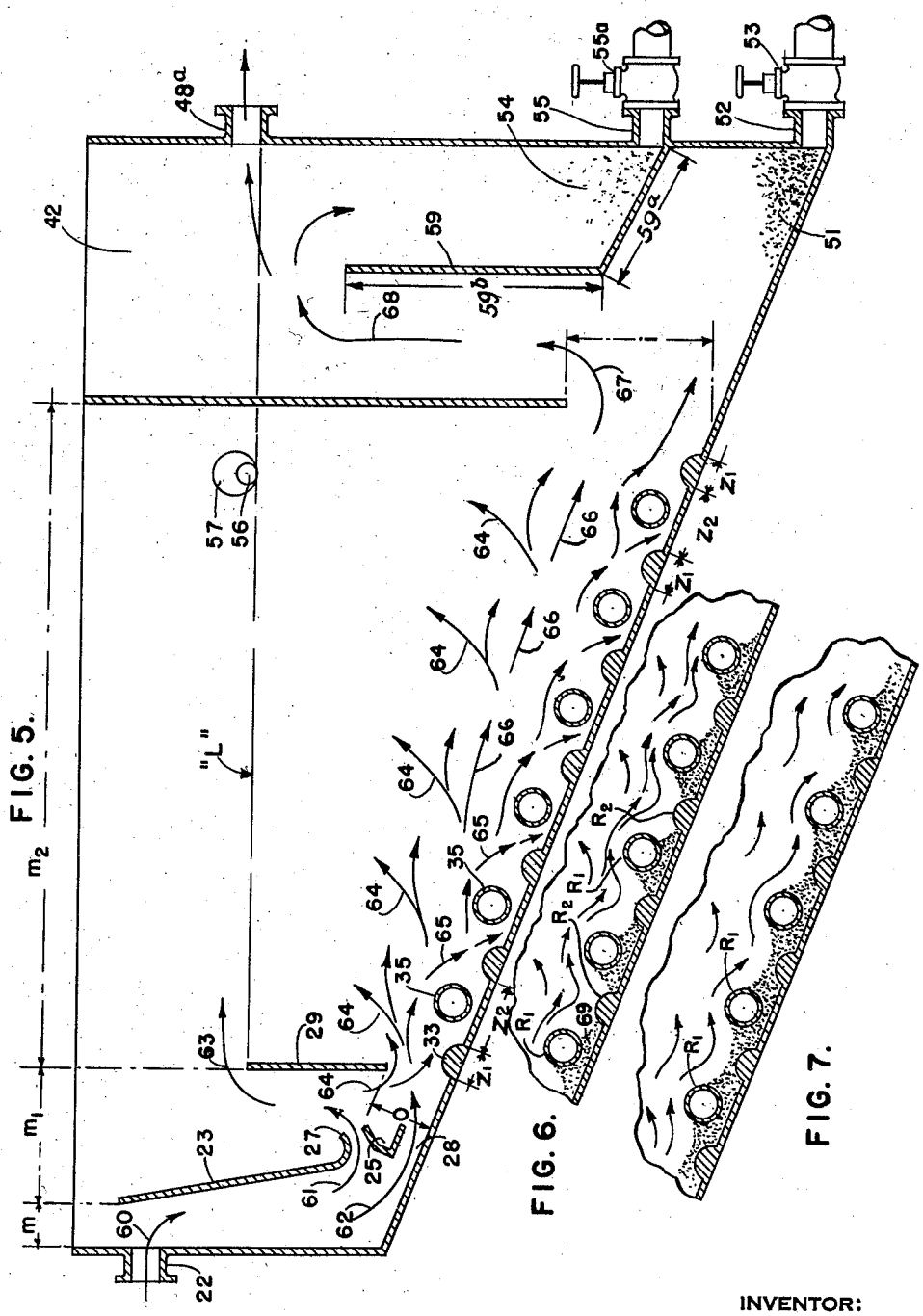
INVENTOR:
WILLIAM A. GEHLE,
BY
ATTORNEY March 28, 1950 W. A. GEHLE 2,502,142
APPARATUS FOR TREATING POLLUTED LIQUIDS
Filed Feb. 26, 1948 4 Sheets-Sheet 4
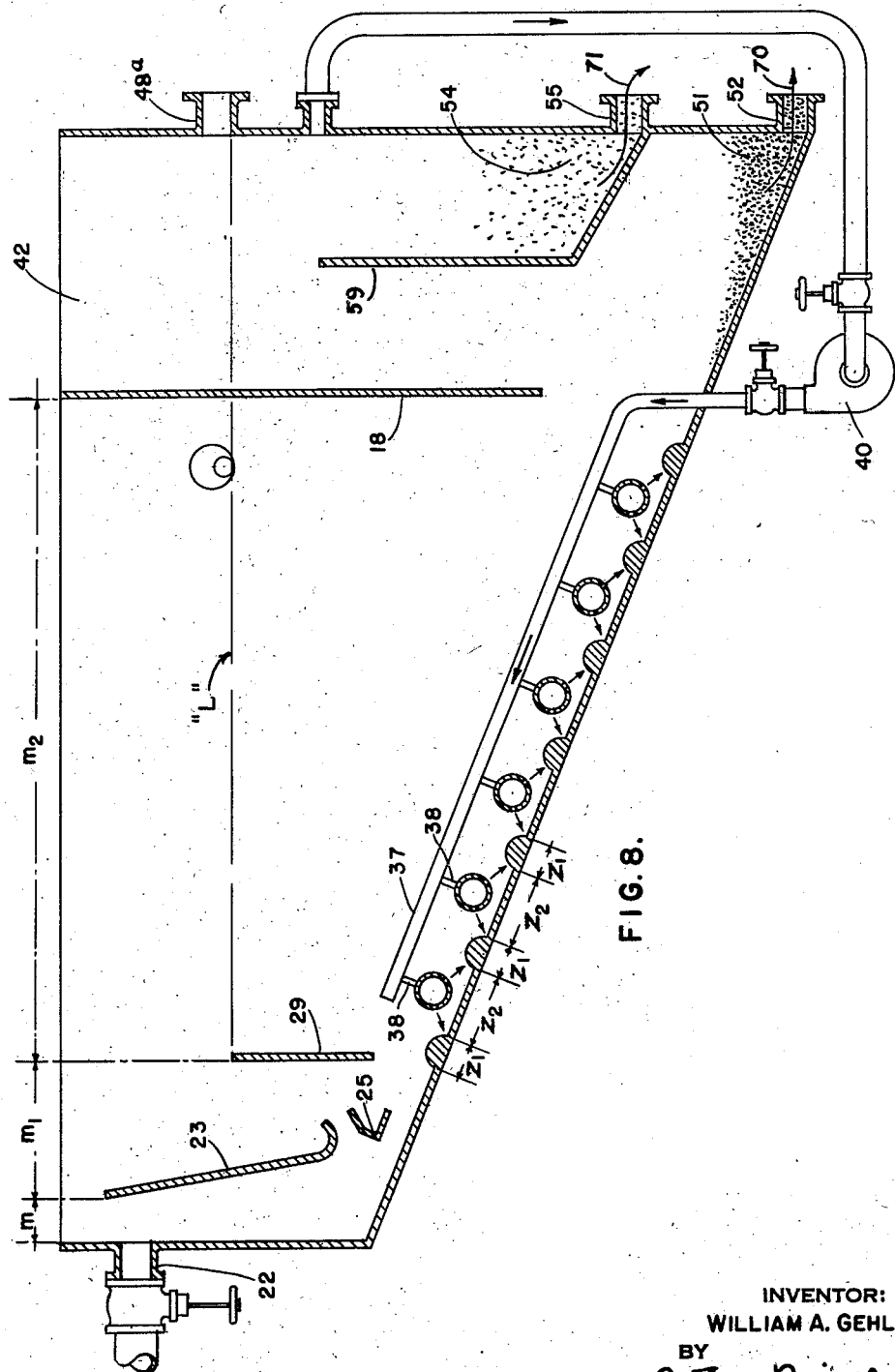
INVENTOR:
WILLIAM A. GEHLE,
BY
ATTORNEY Patented Mar. 28, 1950

2,502,142

UNITED STATES PATENT OFFICE 2,502,142

APPARATUS FOR TREATING POLLUTED LIQUIDS

William A. Gehle, Arlington, N. J.

Application February 26, 1948, Serial No. 11,207

12 Claims. (Cl. 210—51)

This invention relates to apparatus for separating a lighter liquid from a heavier liquid contained in a mixture thereof, for example oil dispersed in water.

Since the problem of separating oil from water is a case in point, this apparatus will herein also be referred to as an oil separator, be it for the purpose of reclaiming oil, or for conditioning or clarifying oil-polluted water so that it may be released eventually into open bodies of water in an unobjectionable condition.

More specifically this invention relates to the kind of oil separators which have no moving parts to effect separation of the oil from the water, but rely upon a system of baffles disposed in a separating chamber through which the liquid or mixture must flow from one end to the other thereof in a generally horizontal direction. The flow may be substantially continuous, that is except for cleaning periods, although it may be at varying rates of flow. In order to encourage the separation of dispersed oil or oil particles from the water, such separators also utilize buoyancy effects in view of the fact that the buoyancy or lifting force component acting upon a submerged oil particle becomes greater and more effective with increasing depth of submergence.

Therefore, in separators of the kind herein contemplated the oil-water mixture is introduced at one end into the separator chamber into a body of liquid therein at a point well below the liquid level in the chamber although at a relatively shallow portion thereof. That is to say, the chamber has a sloping bottom having its relatively deepest point at the horizontally opposite- or outlet end thereof. Oil particles separate from the water as the liquid passes from the shallow inlet end to the deep outlet end of the chamber. That is, when operating the separator chamber contains a relatively quiescent although changing body of liquid the lower or deep-end portion of which comprises substantially oil-freed or clarified water overlain by an accumulation or stratum or layer of separated or substantially water-freed oil. The operation is continuous in that at the outlet end of the chamber separated oil may overflow from the top level, while water passes off at the deepest point by way of a rising water column and an overflow at the top thereof.

Thus in the continuous operation of such apparatus an effluent water column with overflow outside the separating chamber proper is in hydraulic balance with an adjacent body or column of liquid within the chamber, which latter column is composed of a lower body of water and a superimposed body or layer of oil. The relative depth of the oil layer thus forming is dependent upon the respective heights of the overflow levels for the oil and the water relative to one another. Hence, that depth is adjustable or controllable by adjustment of the height differential between these levels.

An oil separator of the type herein contemplated is represented in the patent to Marsh No. 2,076,380 of April 6, 1937. Indeed, the construction embodying this invention is an improvement on the construction disclosed in the Marsh patent, and the basic structural characteristics of the patented device can be discerned in the embodiment of this invention. That is to say, this embodiment includes not only the sloping bottom along with a somewhat oval plan-view shape of the separating chamber, as well as an entrance baffle system similar to that which is typical of the Marsh construction, but also a semblance or similarity of what in the patent are called the "rugae" formed in the bottom of the separator chamber and constituting corrugations or shallow ridges alternating with valleys extending transversely of the general end to end horizontal flow direction of the liquid through the chamber.

The relative size or height or depth of these ridges and valleys in the Marsh construction was not large but the undulatory character of the bottom plays an important part in deflecting oil particles upwardly and encouraging their separation from the body of liquid or water in the separator chamber, as well as in causing a bouncing or cascading of any settled solids such as sand, grit, or other grains of solid matter to the deep-end of the chamber whence these solids may be withdrawn in some suitable manner as through a normally closed bottom clean-out opening.

The separator structure as disclosed in the Marsh patent is a continuously operating one. That is to say, the oil-bearing liquid enters the basin of the separator where it encounters a series of specially shaped baffles disposed and shaped in a manner which is characteristic of the Marsh separator. Accordingly, the liquid or oil-bearing water entering near the top at the inlet end of the separator basin is first deflected substantially directly downwardly, that is towards the bottom at the shallow end of the basin. Near the shallow end of the bottom the liquid meets a peculiarly shaped horizontal flow-splitting baffle whereby there is formed an upper and a lower mouth in the form of a horizontal slot-like lipped opening. This divides the entering liquid into a lower divisional portion or stream containing the heavier constituents of the mixture such as water possibly carrying solids along with a minor proportion of oil or dispersed oil particles, and an upper divisional portion or stream containing the lighter constituents such as oil carrying a minor proportion of water or water particles. Because of the peculiar shape of the feed-splitting baffle and its immediate structural environment the lower mouth directs its divisional stream in a downwardly inclined direction, namely in the direction of the sloping bottom, while the upper mouth directs its divisional stream in an upwardly inclined direction.

The separator according to the Marsh patent has proven to be highly successful and dependable in the matter of water-oil separation, and its ruggedness, separating efficiency, as well as the absence in it of moving parts has commended it into use in other and even not directly related fields. Thus its use was expanded to fields in which it would encounter conditions and separating requirements not originally anticipated for the Marsh separator since that separator had been developed for the prime purpose of separating oil from water, for example in treating the bilge water on ships or similar oil-bearing liquids. That is to say, the Marsh separator was expected to operate and did operate successfully on liquids containing only an insignificant amount of solids or mud that was expected to accumulate only over considerable periods of time and therefore in small quantities at the deep-end of the separator, to be drained off occasionally.

The lower divisional stream of the Marsh separator traverses the bottom corrugations or "rugae" towards the deep-end of the basin meanwhile releasing oil particles upwardly due to the bouncing action induced by the rugae, while any solids that may be present in small quantities cascade down over the rugae and somehow thereby reach the deep-end of the main separator chamber. The upper divisional stream confronts and impinges upon a vertical transverse baffle the lower end of which is spaced an appreciable distance from the sloping bottom, and this encourages a secondary separation of heavier from lighter constituents in the upper divisional stream in that the heavier constituents pass below the baffle and towards the bottom of the chamber, while lighter constituents pass above this baffle towards the top level of the liquid in the separator.

At the deep-end of the separator chamber separated or what is herein called clear water discharges from the bottom by way of rising through a clear water overflow column while oil discharges or overflows from a zone of separated oil overlying the water in the separator chamber. Thus in the operation of the Marsh separator oil-bearing liquid may enter continuously at one end, while the separated fractions of water and of oil discharge or overflow continuously at the other end of the separator or basin.

Expanding into other fields the Marsh separator was used to handle liquids carrying not only oil or fatty waste constituents but also having a relatively high content of solids such as dirt, sand, or cinders or all of them, indeed carrying a kind and a proportion of solids so heavy and so large that these solids in settling not only tended to clog the deep-end outlet for the heavier liquid but also by burying or levelling off the corrugations tended to change the original contour of the bottom which contributes so importantly to the efficient operation of the separator.

That is to say, when the oil-bearing liquid fed to the Marsh separator has a high content of solids, and especially the heavier and gritty ones, their tendency is to settle along the bottom and to remain there, thus filling the valleys or depressions of the corrugations to be as high as the ridges. That is, as the heavier solids collect and accumulate in the valleys, they level off or obliterate the corrugations so that eventually the sloping bottom presented to the flow of liquid appears straight instead of being undulatory or corrugated.

It is, therefore, one of the objects of this invention to prevent the silting-up or burying of the corrugations by the deposits or to un-silt and free the corrugations of its contour-changing deposits in an expeditious, simple and convenient manner which does not require a radical shut-down of the separator in the sense that it must be emptied and the deposits be removed by hand. Indeed, in some industrial applications which involve not only separating the oil from water and clarifying but also the de-silting of large flows of water, this separator while simulating the Marsh type of separator has been built up to relatively huge sizes as a stationary installation. That is to say, the originally conceived Marsh type of separator has been built far beyond the size and capacity originally visualized for its application as a straight oil separator such as for treating the bilge water on ships or the like.

In other words, it is one of the objects of this invention to remedy certain operating difficulties brought on by the adaptation of the Marsh type of separator to such changed capacities and operating conditions. Such difficulties necessitated a complete shut-down of the separator including the drain-off of the body of liquid contained in it, as well as the subsequent removal of the deposits manually. In fact the removal of the deposits in this manner may require a man to bodily enter the large separating chamber and work the deposits down the sloping bottom towards the deep or outlet end of the chamber. To attain the object of obviating or alleviating these difficulties this invention proposes to super-impose upon the bottom corrugations or corrugated bottom surface a system of water-carrying flush-out or flusher pipes extending substantially horizontally and parallel to the corrugations, these flusher pipes being disposed close to although spaced from the bottom in a manner to enable them to effectively stir up the deposits and to cause them with a flow of wash-water to be carried down the sloping bottom to and into a sump at the deep-end of the separator chamber. The flusher pipes direct rows of sub-divisional streams or squirts of pressure flush water into the valleys when de-silting, but when the separator is operating normally and the flush water is shut off then the flusher pipes themselves act as supplementary bottom ridges alternating with the true ridges formed on the bottom. That is to say, these pipes in their function as supplementary ridges become highly effective as such by inducing and encouraging separation. Indeed, no fear need be had of silt accumulating between the pipes and burying the original ridges or obliterating the original bottom contour, as long as there is being re-established what in effect represents a new or super-imposed corrugated bottom contour. This re-established bottom contour which may herein also be termed the false corrugated bottom contour is represented by the exposed top portions of the horizontal flusher pipes in conjunction with the silt valleys between them. Flushing out or de-silting may be effected before the false corrugated contour also becomes obliterated by any further deposits.

According to one feature the rugae or undulations in the bottom face of the original Marsh separator are simulated or approximated by transverse ridges consisting of half-rounds alternating with portions of a straight or plane although sloping bottom, the plane portions thus representing flat valleys between the ridges, while a flusher pipe is disposed directly above and co-extensive with each such valley.

According to another feature there is provided an extension of the sloping bottom at the deep end thereof to form a sloping toe or pocket or sump for primary or heavy deposits at the foot of the rising clear water column, and a second sump or pocket super-imposed upon the first one to catch secondary or lighter deposits at a point intermediate of the rising clear water column.

According to another feature the separator chamber has vertical although curved walls intersected by a longitudinally sloping plane bottom which in turn forms the top of an oil reservoir for the separated oil. The bottom also comprises transversely sloping lateral portions which constitute lateral transitions between a longitudinally sloping bottom portion and the vertical walls. More specifically, the oil reservoir is rectangular in plan view, while the separator walls are irregular or curved in plan view, although inscribed in or within the plan view outline of the reservoir.

According to still another feature a pump is operable to recirculate water from the clear water end of the separator to feed the flusher pipes.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustraated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a plan view of the separator showing the separator chamber super-imposed upon an oil reservoir;

Fig. 2 is a part-sectional side view of the separator and reservoir of Fig. 1;

Fig. 2a is an enlarged view of the bottom corner portion at the shallow end of the separator basin illustrating more clearly the effect of separation-inducing baffles at the influent end of the basin.

Fig. 5 is a diagrammatic longitudinal sectional view of the separator chamber or basin while the flusher pipes are inactive as such, but active as separation encouraging ridges;

Fig. 6 shows a portion of the separator bottom of Fig. 5 and of associated flusher pipes, indicating initial formation of deposits;

Fig. 7 is a view similar to Fig. 6, although showing a more advanced condition of deposit formation;

Fig. 8 is a diagrammatic view similar to that of Fig. 5, although showing the flusher pipes as such in operation, and indicating fractionated solids discharge.

Figure 3:
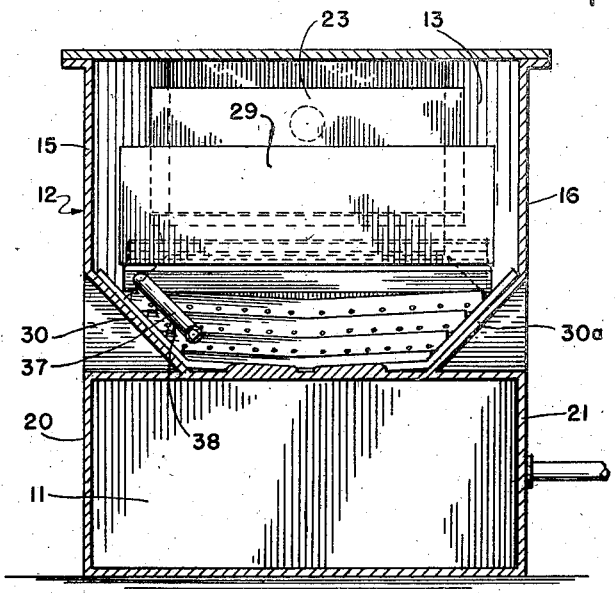
Fig. 3 is a cross-sectional view of the separator taken on line 3—3 of Fig. 2.

The structural embodiment of the separator as shown in Figs. 1 to 3 by way of example is a welded sheet metal construction 10 which comprises a hollow lower section or base or oil reservoir 11 unitary with an upper section 12 representing the separator proper. The separator comprises a basin 13 defined by a sloping bottom or plate 14 which also represents the top of the oil reservoir and has a basic rectangular shape as is seen from the Fig. 1 plan view thereof, and vertical walls, namely the outwardly curved or bulging sides 15 and 16, a plane or transverse feed end wall 17, and opposite to it a plane or transverse outlet end wall 18 parallel to the feed end wall. From the plan view of Fig. 1 it is noted that, geometrically speaking, the vertical walls of the separator or its plan-view outline is tangential to or coincident with the sides of the oil reservoir as represented in plan view by a rectangle defined by its short side $a$ and its long side $b$. Thus the base or oil reservoir 11 is defined by a rectangular although sloping top plate 14 defined by measurements $a$ and $f$ (which also represents the bottom of the separator), a rectangular bottom plate 19 defined by the measurements $a$ and $b$, side walls or plates 20 and 21 defined by the bottom measurement $b$, the vertical measurements $d$ and $e$, and the sloping edge measurement $f$.

In complementary fashion, this allows for the feed end wall 17 of the separator a height $g$ at the shallow end of the separator basin, and a height $h$ for the outlet end wall 18 at the deep end of the basin, considering that the wall 18 terminates a distance $i$ from the deep-end (indicated at E) of the basin proper. Thus the end wall 17 may be defined by measurements $g$ and $k$, while the end wall 18 is defined by measurements $h$ and $l$.

There will now be described the interior of the separator proper, that is the interior of the separator basin as defined by the wall portions so far described:

The end wall 17 is provided near the top thereof with a feed inlet connection 22. Feed liquid entering through this connection meets head-on a baffle wall 23 extending transversely from side to side of the basin and defining a space of influent section $m$ of the basin in which the liquid is deflected downwardly, that is towards the bottom at the shallow end of the basin. The baffle wall 23 is slightly inclined or slightly off vertical so its lower end is spaced slightly farther from the end wall 17 than its upper end, and is partly emerged extending above the normal liquid level N in the basin or chamber, while its lower end terminates a distance $n$ above the bottom and is formed with a lip 24 extending slightly upwardly and towards the interior of the basin. Interposed in the space or distance $n$ is a second or flow-splitting baffle 25 also extending from side to side of the basin and shown to be supported upon the bottom as by brackets indicated at 26. In this way the baffle 25 presents together with the lip 24 and with the bottom an upper horizontally extending mouth or split-flow passage 27, and a lower horizontally extending mouth or split-flow passage 28. The flow-splitting baffle 25 comprises (see Fig. 2$^a$) an intermediate body portion 25$^a$ from which extends an upper lip 25$^b$ forming with the lip 24 the upper mouth 27. From this body portion 25$^a$ also extends a lower lip 25$^c$ forming with the bottom the lower mouth 28. The upper mouth 27 is shaped so as to direct a partial or divisional stream of the incoming liquid upwardly although at an inclined direction and thus at an angle against a third baffle 29 which is submerged and represents a vertical wall extending from side to side of the basin although terminating a distance $o$ above the bottom thus presenting a passage for the partial or divisional stream of liquid that issues from the lower mouth 28 in a downwardly inclined direction, namely in a direction substantially parallel to the bottom. Thus there is also defined an intermediate section of the interior of the separator or basin, namely the section $m_1$ between baffles 23 and 29, larger than the influent section $m$. A next following section of the separator basin is the major section $m_2$ thereof.

Figure 4:
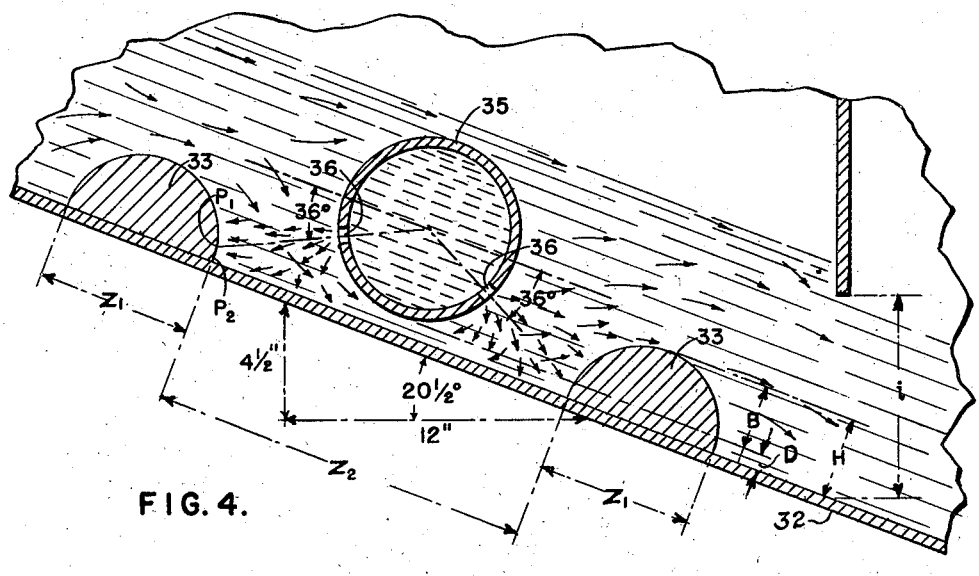
Fig. 4 is a greatly enlarged cross-sectional detail view of a flusher pipe in operation and in its relationship to the adjacent portion and ridges of the separator bottom.

The bottom portion of the basin has inclined sections or filler plates 30 and 30$^a$ to provide slopes at each side between the bottom proper and the side walls. Therefore, the bottom proper of the basin as it appears in the plan view of Fig. 1 is defined as a trapeziform outline or mutilated triangle 32 having a base $p$, inclined sides $q$ and $r$ and a bunted tip $s$. The bottom 32 constituting as it were a part of plate 14 has unitary with it a number of ridges 33 shaped and disposed in a herringbone pattern, each such ridge having at each end thereof an inclined continuation 34 upon and unitary with the filler plates 30 and 30$^a$ and extending transversely thereof. These ridges may be in the form of half-round steel profiles, so-called half-rounds welded to the bottom plates. In this way, the bottom presents a quasi-corrugated surface which is composed (see Fig. 4) of parallel zones $Z_1$, represented by the half-rounds alternating with zones $Z_2$ represented by flat portions of the bottom and representing the spaces between the half-rounds.

A system of flusher pipes 35 is super-imposed upon although spaced a small distance D (see Fig. 4) from the bottom portion 32. The flusher pipes also represent a herringbone pattern, extending parallel and staggered with respect to associated ridges 33. That is to say, the spacing of the flusher pipes with respect to the bottom and with respect to the ridges is such that the height H of the ridge equals the distance D plus a balance B. This relationship of the ridges to the flusher pipes may be said to define a path which is of undulating or meandering shape in that it passes over the ridges and under the flusher pipes. Each flusher pipe is shown to be provided with two parallel rows of jet holes 36 through which flushing water may be directed at an angle towards the bottom. The angle is such that the jet is directed to a point $P_1$ upon a ridge, that is to a point slightly above the base point $P_2$ of the ridge. In the embodiment shown and detailed in Fig. 4 the bottom incline is shown to be about 4½" to 12" which is equivalent to an angle of about 20½", while the angle of direction of the jets of flush water issuing from the jet holes are directed under an angle of about 36" against the bottom.

The flusher pipes 35 are supplied with flush water by a header 37 having short branch connections 38 leading into the respective ends of the flusher pipes. The header 37 in turn is connected to a supply pipe 39 leading through the vertical side wall of the separator basin from a pump 40 which may draw its supply through a pipe 41 from the clear water effluent end of the separator, which will be presently described. Pump 40 is driven by motor 40$^a$.

The clear water effluent end of the separator comprises a chamber 42 of substantially vertical extent which is unitary with the separator basin and communicates with the liquid body in the interior thereof through opening or passage $i$ at the deep-end of the basin. The chamber 42 is defined by a sloping bottom 43 which in effect is a continuation of the sloping bottom 32 of the separator basin, and a vertical wall 43$^a$ which is D-shaped in the cross-section of Fig. 1. The chamber 42 is provided with baffles 44 and 45 which define a tortuous flow-path for the separated water, namely an upward course as indicated by arrow 46, followed by a downward course indicated by arrow 47, followed by an upward course indicated by arrow 48 leading to the clear water effluent overflow discharge connection 48$^a$.

The baffle 44 has a sloping bottom portion 49 and a vertical top portion 50, providing a space underneath the sloping portion presenting a toe or pocket or primary sump 51 in which collects a heavy fraction of solids or grit which may find its way downward from the basin with the flow of water or which may be brought down by the flusher pipes when the same are operating to loosen up solids which have settled between them on the bottom. A drain or sludge discharge connection 52 provided with valve 53 may be opened to discharge the grit accumulation from the pocket 51.

The space directly above the slopping portion 49 of baffle 44 constitutes a secondary sump 54 in which collects a lighter fraction of solids, namely the ones that are light enough to be carried up the course 46 and down the course 47, but which when directed downwardly along the sloping baffle portion 49 will be arrested in the secondary sump 54 while substantially clarified water rises up the last course 48 to the clear water overflow connection 48$^a$. A drain connection 55 is provided with a control valve 55$^a$ through which the secondary or lighter solids fraction or sludge may be discharged whenever desired.

It will be noted that in the embodiment of Figs. 1 and 2 the pump 40 draws its supply of flush water through pipe 41 from the clear water end of the separator, namely from the upper portion of the upflow course 48, that is from a point just below the overflow discharge connection 48$^a$.

An overflow discharge connection for the separated oil layer floating upon the body of water in the basin, is indicated at 56, its overflow elevation being adjustable as by an eccentric device 57 similar to that shown and described in the aforementioned Marsh patent. An oil discharge connection or pipe 58 leads from the oil overflow 56 to the oil reservoir 11, comprising a flexible tube portion 58$^a$ to allow for adjustments of the oil overflow level.

The operation will be described in view of the diagrammatic Figs. 5, 6, 7, and 8. Parts of the diagrammatic structure are identified by numerals of corresponding parts in Figs. 1, 2, and 3, except for the baffle arrangement in the clear water effluent section of the separator, that is in the chamber 42, which has been simplified by the showing of only one baffle 59.

Fig. 5 illustrates the normal operation of the separator, that is with the flusher pipes 35 inoperative. The feed liquid, that is a mixture of oil- and water-carrying solids or grit enters the separator 17 or basin through the inlet connection 22 and, as indicated by an arrow 60, is deflected downwardly by baffle 23 and towards the bottom of operating section $m$ of the separator basin. In the lower part of section $m$ the flow of liquid splits into an upwardly inclined stream indicated by arrow 61 passing through the upper mouth 27, and a downwardly inclined stream indicated by arrow 62 passing through mouth 28.

This primary split-up of the liquid represents a rough separation into a lower stream containing water with a smaller proportion of oil along with heavy solids or potential gritty deposits, and an upper stream containing a smaller proportion of water and accordingly a larger proportion of oil. The upper stream 27 is directed at an upward incline towards the baffle 29 effecting a secondary separation into a portion passing upwardly and over the baffle, as indicated by arrow 63, and a portion passing downwardly and under the baffle 29 as indicated by arrow 64. Thus the downwardly directed secondary portion 64 is that which contains relatively more of the heavier liquid, that is water as well as solids along with the oil, while the upwardly directed stream contains a relatively smaller proportion of water and a correspondingly larger proportion of oil.

The lower secondary divisional stream 64 joins the lower primary divisional stream 62, both jointly passing through the opening or passage $o$ underneath baffle 29 and into the section $m_2$ of the basin. The oil particles still contained in the water have a chance to rise upwardly as indicated by arrows 64, while grit or the like tends to drop out and onto the bottom as indicated by arrows 65, and while water passes in the general direction of arrows 66 towards the deep end of section $m_2$ and through the opening or passage $i$ to the clear water effluent of the separator. That is, the separated or clear-water fraction passes into and through the chamber 42 by flowing upwardly as according to arrows 67 and 68 and over the baffle 59 to and through the clear-water effluent connection 49. A portion of the solids, that is a heavy fraction carried by the water may reach the lower or primary sump or pocket 51 while a lighter fraction is carried up and over the baffle 59 to gravitate into the secondary sump or pocket 54.

The separation of water, oil and grit just described, is notably helped by the effect of the corrugated or quasi-corrugated bottom contour, and notably by the effect of the flusher pipes 35 acting as transverse separation-inducing ridges. Indeed in this way a portion of the solids or gritty matter intermixed with lighter solids will form deposits in spaces between the flusher pipes as well as in the space between them and the bottom. An initial or intermediate stage of such deposit formation is illustrated in Fig. 6, the deposit being indicated at 69 to be building up at the underside of the pipes 35, and even beginning to cover the base portion of the intervening ridges 33, thus forming the beginning of an undulated bottom contour in which high ridges $R_1$ alternate with low ridges $R_2$.

In Fig. 7 the deposit formation has further progressed to the extent that the high ridges $R_1$ represented by the flusher pipes 35 are still well exposed and effective while the low ridges or half-rounds 33 have become buried or occluded by the silt deposits which form now somewhat shallower valleys between the high ridges, still presenting an undulated or corrugated contour which is as such encouraging separation.

However, in order to avoid further silting-up of the valleys and obliteration of the undulated contour, the active operation of the separator as such may now be stopped temporarily, while pump 40 may be started supplying pressure flush water to the flusher pipes 35. Thus a large number of flush water jets issue from the jet openings 36 as indicated by the arrows in Figs. 4 and 8, which stir up the deposits and cause them to cascade downwardly or be carried along downwardly with the flow of flush-water towards the water outlet end of the separator.

Whereas flush-water from an outside source may be used, according to the Fig. 8 embodiment the pump 40 recirculates water from the clear-water outlet end of the separator itself by drawing it through pipe 41 and delivering it under suitable pressure to the header 37 supplying the flusher pipes. In this way there is accumulated a heavy and a light fraction of solids in the primary and the secondary sumps 51 and 54 from which they may be drained off after the flushing operation has been completed and the flush-water supply has been shut. Removal or drainage of the solids or sludge fractions from their respective sumps is indicated (in Fig. 8) by respective arrows 70 and 71.

An alternative mode of the flushing operation is to continue the feed liquid supply through inlet 22 as well as the overflows 56 and 49 for oil and water respectively, while recirculation of flush-water from the clear-water end of the separator to the flusher pipes is allowed to function. In that instance the draining of the solids or sludges from the respective sumps 51 and 54 may be allowed to take place either simultaneously with or following the flushing operation.

While in the foregoing there has been described an embodiment of the invention in which the construction of the separator is shown to be of welded steel plate, this should not exclude a construction which is of concrete instead of steel plate, or which is part concrete and part steel. The tank construction may be of concrete and tile, the flusher pipe system being of steel and otherwise installed in the manner shown.

I claim:

1. A separator apparatus for treating a mixture of a lighter and a heavier liquid component carrying gritty solids, to effect the separation of said liquid components from one another and from said solids, which comprises a horizontally elongated basin having a sloping bottom portion and substantially vertical wall portions providing a relatively shallow inlet end and a deep outlet end whereby liquid is adapted to pass in a generally horizontal longitudinal direction through said basin, said vertical wall portions comprising outwardly bulging although vertical side wall portions and vertical end wall portions, said sloping bottom portion comprising a downwardly inclined trapeziform central portion with its wide end disposed at the inlet end and its narrow end disposed at the outlet end of the basin and further comprising a downwardly as well as laterally inclined although plane lateral portion extending along each side of said central portion, said central portion having transversely extending ridges and valleys, inlet means at said shallow end for introducing said mixture, separation inducing baffle means disposed in the basin at the inlet end thereof, light-liquid overflow means at the top of said deep end, heavy-liquid overflow means constituting a rising clear water column at said deep end comprising a vertical outer chamber adjacent to the deep end, the deep end of the basin having at the bottom a liquid passage for substantially clear water to pass therethrough from the deep end of the basin into the bottom end of said vertical chamber, said vertical chamber having an overflow at the top for discharging clear water therefrom, controllable means for discharging sediment from the bottom end portion of said vertical chamber, a plurality of flusher pipes extending substantially parallel to said ridges and valleys and disposed in alternation with said ridges and spaced a distance from the bottom of said valleys whereby they extend partially in said valleys and substantially not beyond the area of said trapeziform bottom portion, said pipes having rows of jet holes from which water jets are adapted to issue when the removal of gritty deposits from said valleys is desired, said pipes being disposed to serve as supplementary elevated ridges for encouraging separation when not flushing, and controllable means for supplying flush-water to said pipes.

2. Apparatus according to claim 1, a hollow base for said basin representing a reservoir for separated lighter liquid overflowing from said basin, the top portion of said hollow base comprising the trapeziform bottom portion of the basin.

3. Apparatus according to claim 1, in which said vertical chamber comprises a vertical wall connected along a pair of substantially vertical lines with the respective vertical end wall of the basin, and having a sloping bottom substantially in line with the central sloping bottom of said basin, and having a submerged transversely extending baffle wall comprising an outwardly and downwardly sloping bottom portion spaced upwardly from the first-mentioned sloping bottom portion, and further having an upright top portion, said baffle wall defining a primary sump underneath and a secondary sump above whereby said secondary sump is vertically superimposed upon said primary sump, and in which apparatus said sediment discharge means comprise separate drainage means for said primary sump and for said secondary sump respectively.

4. Apparatus according to claim 1, in which said vertical chamber comprises a vertical wall connected along a pair of substantially vertical lines with the respective vertical end wall of the basin, and having a sloping bottom substantially in line with the central sloping bottom of said basin, and having a submerged transversely extending baffle wall comprising an outwardly and downwardly sloping bottom portion spaced upwardly from the first-mentioned sloping bottom portion, and further having an upright top portion, said baffle wall defining a primary sump underneath and a secondary sump above its sloping bottom portion, a second substantially vertical baffle wall partially submerged and extending transversely of said vertical chamber and disposed above said secondary sump, both said transverse baffle walls defining within the vertical chamber an upflow section leading from said primary sump, a subsequent downflow section defined by the space between said vertical baffle walls, and an upflow section leading from said secondary sump to the clear-water overflow of the vertical chamber, and in which apparatus said sediment discharge means comprise separate drainage means for said primary sump and for said secondary sump respectively.

5. Apparatus according to claim 1, in which said vertical end portions of the basin extend in respective transverse planes, with the addition of a hollow base structure for said basin representing a reservoir for separated lighter liquid overflowing from said basin, said basin comprising a bottom portion, upright end wall portions rising from said bottom portion and co-planar with the respective end portions of the basin, and a sloping top portion comprising said trapeziform portion.

6. Apparatus according to claim 1, with the addition of a pump, conduit means leading from said vertical chamber to said pump, conduit means leading from the outlet end of the pump to said flusher pipes, said pump being operable to recirculate clear water from said vertical chamber to said flusher pipes for flushing, and controllable shut-off means in at least one of said conduit means.

7. A separator apparatus for treating a mixture of a lighter and a heavier liquid component carrying gritty solids, to effect the separation of said liquid components from one another and from said solids, which comprises a horizontally elongated basin having a sloping bottom portion and substantially vertical wall portions providing a relatively shallow inlet end and a deep outlet end whereby liquid is adapted to pass in a generally horizontal longitudinal direction through said basin, said vertical wall portions comprising outwardly bulging although vertical side wall portions and vertical end wall portions, said sloping bottom portion substantially defined by a downwardly inclined plane having transversely extending ridges and valleys, inlet means at said shallow end of the basin for introducing said mixture, separation-inducing baffle means disposed in the basin at the inlet end thereof, light-liquid overflow means at the top of said deep end, heavy-liquid overflow means constituting a rising clear water column at said deep end and comprising a vertical outer chamber adjacent to the deep end, the deep end of the basin having at the bottom a liquid passage for substantially clear water to pass therethrough from the deep end of the basin into the bottom end of said vertical chamber, said vertical chamber having an overflow at the top for discharging water therefrom, controllable means for discharging sediment from the bottom end portion of said vertical chamber, a plurality of flusher pipes extending substantially parallel to said ridges and valleys disposed in alternation with said ridges and spaced a distance from the bottom of said valleys whereby they extend partially in said valleys, said pipes having rows of jet holes from which water jets are adapted to issue when the removal of gritty deposits from said valleys is desired, said pipes being disposed to serve as supplementary elevated ridges for encouraging separation when not flushing, and controllable means for supplying flush-water to said pipes.

8. A separator apparatus for treating a mixture of a lighter and a heavier liquid component carrying gritty solids, to effect the separation of said liquid components from one another and from said solids, which comprises a horizontally elongated basin having a sloping bottom portion and substantially vertical wall portions providing a relatively shallow inlet end and a deep outlet end whereby liquid is adapted to pass in a generally horizontal longitudinal direction through said basin, said vertical wall portions comprising outwardly bulging although vertical side wall portions and vertical end wall portions, said sloping bottom portion comprising a downwardly inclined trapeziform central portion with its wide end disposed at the inlet end and its narrow end disposed at the outlet end of the basin and further comprising a downwardly as well as laterally inclined although plane lateral portion extending along each side of said central portion, said central portion having transversely extending ridges and valleys, inlet means at said shallow end for introducing said mixture, separation-inducing baffle means disposed in the basin at the inlet end thereof, light-liquid overflow means at the top of said deep end, heavy-liquid overflow means constituting a rising clear water column at said deep end comprising a vertical outer chamber adjacent to the deep end, the deep end of the basin having at the bottom a liquid passage for substantially clear water to pass therethrough from the deep end of the basin into the bottom end of said vertical chamber, said vertical chamber having an overflow at the top for discharging clear water therefrom, and controllable means for discharging sediment from the bottom end portion of said vertical chamber.

9. Apparatus according to claim 8, in which said vertical chamber comprises a vertical wall connected along a pair of substantially vertical lines with the respective vertical end wall of the basin, and having a sloping bottom substantially in line with the central sloping bottom of said basin, and having a submerged transversely extending baffle wall comprising an outwardly and downwardly sloping bottom portion spaced upwardly from the first-mentioned sloping bottom portion, and further having an upright top portion, said baffle wall defining a primary sump underneath and a secondary sump above whereby said secondary sump is vertically superimposed upon said primary sump, and in which apparatus said sediment discharge means comprise separate drainage means for said primary sump and for said secondary sump respectively.

10. Apparatus according to claim 8, in which said vertical chamber comprises a vertical wall connected along a pair of substantially vertical lines with the respective vertical end wall of the basin, and having a sloping bottom substantially in line with the central sloping bottom of said basin, and having a submerged transversely extending baffle wall comprising an outwardly and downwardly sloping bottom portion spaced upwardly from the first-mentioned sloping bottom portion, and further having an upright top portion, said baffle wall defining a primary sump underneath and a secondary sump above its sloping bottom portion, a second substantially vertical baffle wall partially submerged and extending transversely of said vertical chamber and disposed above said secondary sump, both said transverse baffle walls defining within the vertical chamber an upflow section leading from said primary sump, a subsequent downflow section defined by the space between said vertical baffle walls, and an upflow section leading from said secondary sump to the clear-water overflow of the vertical chamber, and in which apparatus said sediment discharge means comprise separate drainage means for said primary sump and for said secondary sump respectively.

11. Apparatus according to claim 8, with the addition of a hollow base structure for said basin representing a reservoir for separated lighter liquid overflowing from said basin, said basin comprising a bottom portion, upright wall portions rising from said bottom portion, and a sloping top portion comprising said trapeziform portion.

12. Apparatus according to claim 8, in which said vertical end portions of the basin extend in respective transverse planes, with the addition of a hollow base structure for said basin representing a reservoir for separated lighter liquid overflowing from said basin, said basin comprising a bottom portion, upright end wall portions rising from said bottom portion and co-planar with the respective end portions of the basin, and a sloping top portion comprising said trapeziform portion.

WILLIAM A. GEHLE.

REFERENCES CITED

The following references are of record in the file of this patent:

UNITED STATES PATENTS

| Number | Name | Date |
|---|---|---|
| 353,775 | Booraem | Dec. 7, 1886 |
| 1,383,433 | Smith | July 5, 1921 |
| 1,496,160 | Marsh | June 3, 1924 |
| 1,890,712 | Zeitz | Dec. 13, 1932 |
| 1,927,410 | Marsh | Sept. 19, 1933 |
| 2,076,380 | Marsh | Apr. 6, 1937 |
| 2,270,616 | Bell | Jan. 20, 1942 |
| 2,284,737 | Hirshstein | June 2, 1942 |
| 2,422,555 | Karlson et al. | June 17, 1947 |